United States Patent [19]
Wilhite

[11] 3,871,289
[45] Mar. 18, 1975

[54] BALE MEASURING DEVICE

[76] Inventor: George W. Wilhite, Rt. 1, Kuna, Idaho 83634

[22] Filed: Nov. 23, 1973

[21] Appl. No.: 418,481

[52] U.S. Cl.......................... 100/4, 100/19, 100/191
[51] Int. Cl.......................... B65b 13/02, B65b 13/06
[58] Field of Search ......... 100/4, 19, 188, 191, 179; 56/343

[56] References Cited
UNITED STATES PATENTS

| | | | |
|---|---|---|---|
| 2,720,159 | 10/1955 | Seltzer | 100/4 |
| 2,732,791 | 1/1956 | Adkisson | 100/4 |
| 2,778,295 | 1/1957 | Luek et al. | 100/4 |
| 2,807,996 | 10/1957 | Barnes et al. | 100/4 |
| 3,221,639 | 12/1965 | Rimmey | 100/4 |
| 3,371,596 | 3/1968 | Nelson | 100/4 |

Primary Examiner—Peter Feldman
Attorney, Agent, or Firm—John W. Kraft; Charles L. Kraft

[57] ABSTRACT

The bale measuring device comprises a journally mounted actuator assembly having a cam arm disposed horizontally and substantially transversely to the upper terminal edge of the discharge chute of a commonly known baler on a mounting bearing and an actuator arm pivotally secured to a connecting link which in turn is connected to the bale cutting mechansim of the baler and urging means to return the actuator arm to a position wherein the cam arm is disposed transversely in the chute and the connecting link is in its relaxed, feeding position; and a metering chain is mounted on a carrier arm, which is disposed rectilinearly in the discharge chute and including a pair of sprockets which describe circuit of the roller chain and wherein said roller chain includes metering studs which engage the forewardmost terminal end of a bale or cam the cam arm of the actuator rearwardly to actuate the cutoff mechanism.

2 Claims, 3 Drawing Figures

BALE MEASURING DEVICE

FIELD OF INVENTION

The present invention relates to baling machines, and more particularly to a device for measuring bales and actuating the bale cutting device typically provided thereon.

DESCRIPTION OF THE PRIOR ART

Means commonly used and employed for metering the length of bales in a baler is typically a spurred wheel journally mounted on a fixed shaft at the uppermost terminal edge at the side of the baler discharge chute. It has been found that this type of mechanism is highly inaccurate to produce bales of uniform length. One reason attributed for this inaccuracy is that the wheel is fixedly mounted, and variations in the thickness of a bale may cause the wheel to come out of engagement with the bale material and to not meter properly. Another reason attributed for this inaccuracy has been that the wheel is commonly exposed to high-impack for this kind of weather and the like which may cause the wheel to wear unevenly.

Accordingly, it is an object of the present invention to provide an improved bale measuring device which may ride continuously over a bale despite variations in bale thickness and the like.

It is another object of this invention to provide an improved bale measuring device which is inherently more durable than bale measuring devices of the prior art.

These and other objects shall become apparent from the description following, it being understood that modifications may be made without affecting the teachings of the invention here set out.

SUMMARY OF THE INVENTION

The bale measuring device comprises a journally mounted actuator assembly having a cam arm disposed horizontally and substantially transversely to the upper terminal edge of the discharge chute of a commonly known baler on a mounting bearing and an actuator arm pivotly secured to a connecting link which in turn is connected to the bale cutting mechanism of the baler and urging means to return the actuator arm to a position wherein the cam arm is disposed transversely in the chute and the connecting link is in its relaxed, feeding position; and a metering chain mounted on a carrier arm which is disposed rectilinearly in the discharge chute and including a pair of sprockets which describe circuit of the roller chain and wherein the roller chain includes metering studs which engage the forewardmost terminal end of a bale or cam the cam arm of the actuator rearwardly to actuate the cutoff mechanism.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
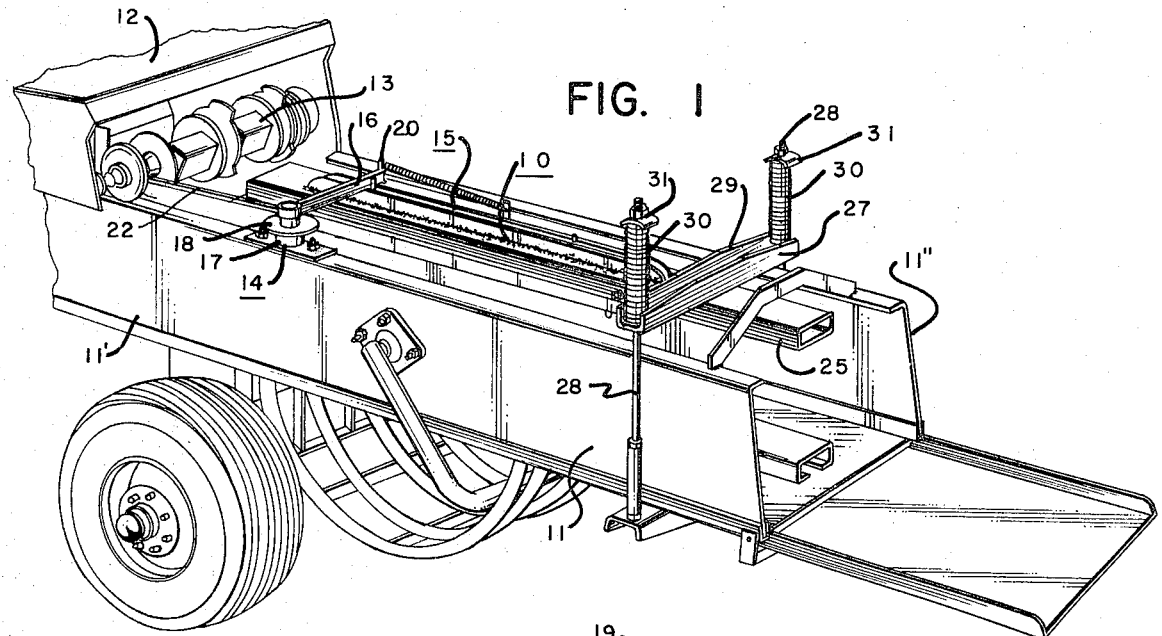
FIG. 1 is a left rear perspective view of the bale measuring device of this invention shown in the environment of the discharge chute of a baler.

Referring to the drawings and more particularly to the FIG. 1, the bale measuring device of the present invention is shown to advantage and generally identified by the numeral 10. The bale measuring device 10 is intended to be mounted on the discharge chute 11 of a commonly known baler 12. The bale measuring device 10 is intended to actuate the cutoff mechanism 13 of the baler 12 in the manner which shall hereinafter be described. The bale measuring device 10 comprises an actuator assembly 14 and a metering chain 15.

Figure 2:
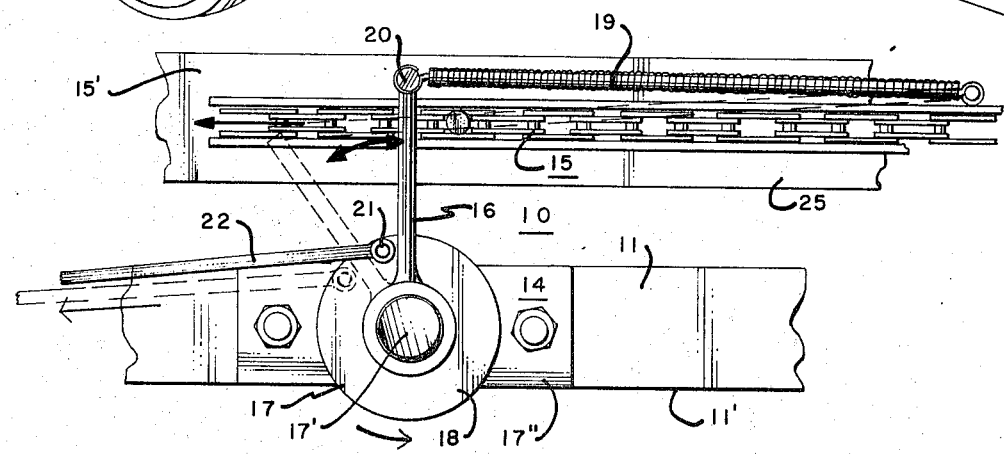
FIG. 2 is a fragmentary top plan view of the bale measuring device showing the operational movement in broken lines for illustration purposes.

Referring to the FIG. 2, the actuator assembly 14 is mounted distally rearward of the forwardmost terminal end of the discharge chute 11. The assembly 14 comprises a cam arm 16 mounted transversely and substantially horizontal to the uppermost terminal edge of the chute 11 on a mounting bearing 17, a web 18 fastened substantially horizontal and below the arm 16 on the bearing 17, and an operating spring 19. The bearing 17 is journally mounted on an upstanding shaft 17' which is in turn fastened to the uppermost terminal edge of one of the channel-like side panels 11' of the chute 11 by a suitable mounting means such as a bearing mounting plate 17'. The arm 16 is mounted substantially transversely and horizontally to the chute 11 and positioned to be cammed forwardly with respect to the baler 12 by means provided on the metering chain 15. The outwardly projecting terminal end of the arm 16 is provided with a stud 20 to which an urging spring 19 is fastened. The opposite terminal end of the spring 19 is fastened to a point distally rearward of the bearing 17 to the top wall 15' of the metering chain 15 which is disposed parallel to the baler side wall 11'. The disklike web 18 is fastened distally below the arm 16, and is provided with a pivot 21 which pivotally engages a connector link 22 which actuates the cutoff mechanism 13. The pivot 21 is eccentrically locked to the bearing 17, substantially along the same radius as the arm 16. The length of throw of the link 22 may be changed by changing the distance between the pivot 21 and the center of the bearing 17. The circular or disklike web 18 provides a guard between material projecting from the chute 11 and the assembly 14. It is to be understood that more complicated, compound mechanisms may be employed. It is also to be understood that, while the spring 19, is disposed as described and provided in this embodiment, other urging means, bias springs, and the like, may be used to equal effect.

Figure 3:
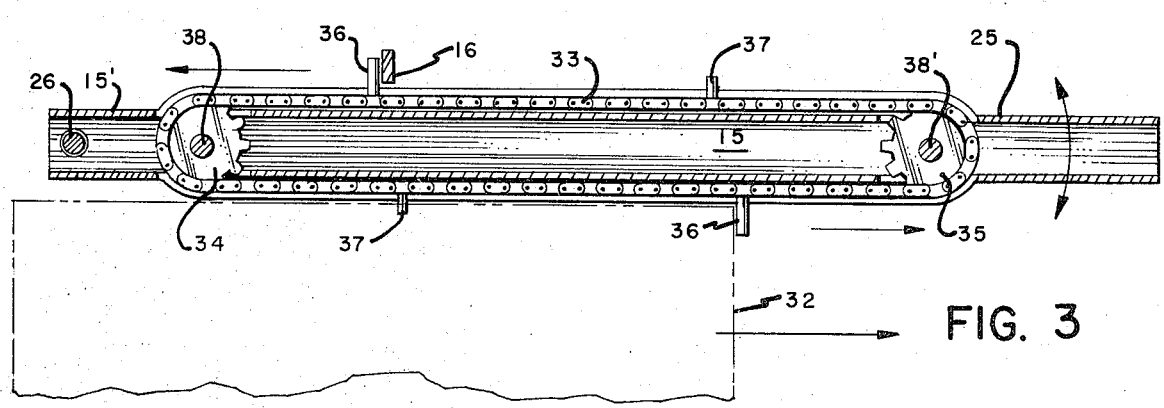
FIG. 3 is a fragmentary side elevational view of the bale measuring device, shown with the bale in broken lines for illustrative purposes.

Referring to the FIG. 3, the metering chain 15 includes the carrier arm 25 which is pivotly mounted rectilinearly in the chute 11 on an axle 26 disposed transversely between the upper forwardmost portion of the sidewalls 11' and 11" distally forward of the bearing 17. As shown in FIG. 1, the terminal end opposite the axle 26 of the carrier arm 25 is suitably fastened to a floating tension bracket 27. The floating bracket 27 includes a pair of upstanding shafts 28 suitably fastened to the rearward portion of the chute 11, a transverse bar 29 slideably mounted on the rods 28' by means of coil springs 30 disposed about the rod 28 and fastened by locking means 31 between the terminal ends of the bar 29' and locking means 31. It may be seen that the carrier arm 25 is operable to fully contact the terminal side of the uppermost side of a hay bale 32, regardless of variations in thickness. The metering chain 15 also includes a roller chain 33, a pair of sprockets 34 and 35, metering studs 36, and idling studs 37. Sprockets 34 and 35 are mounted at the forward and rearward portions of the carrier arm 25 by means of journally mounted shafts 38 and 38' respectively, and scribe the circuit of the chain 33. The metering studs 36 project from the chain 33 at predetermined intervals which shall hereinafter be described, and are sufficiently long to both engage the center of a hay bale 32 and cam the arm 16 forwardly to actuate the cutter mechanism 13 of the baler 12. The idling studs 37 project also outwardly from the chain 33 to ensure the discharging bale 32 actuates the metering chain 15. The idling studs 37 are distally shorter than the metering studs 36' and are operable to pass by the arm 16 without activating the cutter mechanism 13. It may be seen that a multiplicity of idling studs 37 may be disposed over the length of chain 33 and is desired.

In operation, a bale 32 is discharged rearwardly through the chute 11 in the direction shown by the lowermost horizontal arrow in FIG. 3; and the forewardmost terminal end of the bale 32, with respect to its direction of travel, engages one of the metering studs 36. The metering stud 36 and one or more of the idling studs 37 engage the center of the uppermost terminal side of the bale 32 as the bale 32 is urged by the baler 12 through the chute 11, thus causing the chain 33 and the sprockets 34 and 35 to move in the direction shown by the arrows in FIG. 3. Thus, the lowermost metering stud 36 with respect to the chain 33 is urged rearwardly with respect to the chute 11, as set out above, while the upper unengaged stud 36 moves forewardly with respect to the chute 11, also shown in the FIG. 3. When one of the metering studs 36 contacts the rearwardmost terminal side of the arm 16, the arm 16 of the bearing 17 and the disk-like web 18 are rotated with the arm 16 and pivot 21 being urged forwardly pushing the connector link 22 forwardly. At a predetermined distance the stud 36 overruns the rearward terminal side of the arm 16, thus urging the arm 16 and web 18 rearwardly to their respective rest position, as described above and the link 22 and mechanism 13 return to their respective position. It may be seen that the length of the bale 32 is determined by the rectilinear distance between the metering studs 36 as seen in the FIG. 3. It may also be seen that other distances, than that described, may be made by changing the length of the chain 33 or adding additional studs 36.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In combination with a commonly known baler having a bale cutoff mechanism and a discharge chute, a bale measuring device, comprising:

an actuator assembly having a cam arm disposed horizontally substantially transversely of the uppermost terminal edge of said discharge chute on a mounting plate bearing at the uppermost edge of one sidewall of said chute, a web being fastened to said bearing and pivotly to a connecting link on a eccentrically disposed pivot, said connecting link being mechanically associated with said cutoff mechanism, said cam arm including urging means to return said cam arm to a substantially transverse position and said actuator arm to a position wherein the connecting link is in its feed position; and a metering chain mounted on a carrying arm which is disposed rectilinearly in said discharge chute wherein said carrier arm is pivotly mounted on an axle which is fastened transversely to the uppermost terminal edge of said chute distally forward of said actuator assembly, and being mounted on a floating bracket at the end opposite axle to permit said meter chain to follow the uppermost terminal side of a bale regardless of variations in said bale, a pair of sprockets suitably journally mounted in said carrier arm, a roller chain disposed about said sprockets in circuit metering studs which project at predetermined intervals from said roller chain to cam said cam arm.

2. The apparatus of claim 1 including idling studs disposed at intervals between said metering studs on said chain, said idling studs being shorter than said metering studs.

* * * * *